(12) United States Patent
Heindel et al.

(10) Patent No.: US 12,077,322 B2
(45) Date of Patent: Sep. 3, 2024

(54) GAS BEARING SYSTEM

(71) Applicant: European Space Agency, Paris (FR)

(72) Inventors: Stefan Heindel, Noordwijk (NL);
Florian Liebold, Noordwijk (NL)

(73) Assignee: European Space Agency, Paris (FR)

( * ) Notice: Subject to any disclaimer, the term of this patent is extended or adjusted under 35 U.S.C. 154(b) by 350 days.

(21) Appl. No.: 17/454,780

(22) Filed: Nov. 12, 2021

(65) Prior Publication Data

US 2022/0170509 A1   Jun. 2, 2022

(30) Foreign Application Priority Data

Nov. 27, 2020   (EP) ..................................... 20210368

(51) Int. Cl.
*B64G 1/22*   (2006.01)

(52) U.S. Cl.
CPC ..................... *B64G 1/22* (2013.01)

(58) Field of Classification Search
CPC ........... B64G 1/28; B64G 1/283; B64G 1/286
See application file for complete search history.

(56) References Cited

U.S. PATENT DOCUMENTS

| 8,186,882 | B2 | 5/2012 | Derrick et al. |
| 10,598,192 | B2 | 3/2020 | Bukland et al. |
| 2008/0099626 | A1* | 5/2008 | Bialke .................... B64G 1/244 244/165 |
| 2010/0289362 | A1* | 11/2010 | Petrenko .................. H02K 7/08 310/90 |
| 2012/0020596 | A1 | 1/2012 | Dupont |
| 2014/0209751 | A1* | 7/2014 | Stagmer ................. B64G 1/244 244/165 |
| 2016/0363165 | A1 | 12/2016 | Lin et al. |
| 2018/0087566 | A1* | 3/2018 | Chien .................. F16C 32/0625 |
| 2018/0313402 | A1* | 11/2018 | Jiang ..................... F16C 17/045 |

FOREIGN PATENT DOCUMENTS

| CN | 101490430 A | 7/2009 |
| EP | 2 306 019 A1 | 4/2011 |
| EP | 2 312 158 A1 | 4/2011 |
| GB | 2577710 A | 4/2020 |
| JP | S52-92048 A | 8/1977 |
| JP | H086748 B2 | 1/1996 |

(Continued)

OTHER PUBLICATIONS

European Examination Report for European Application No. 20 210 368.5, dated Dec. 21, 2022, 7 pgs.

(Continued)

*Primary Examiner* — Timothy D Collins
*Assistant Examiner* — Justin Michael Heston
(74) *Attorney, Agent, or Firm* — Seed IP Law Group LLP

(57) ABSTRACT

A bearing assembly for stabilizing rotation of a rotatable element includes a gas bearing acting as a bearing for the rotatable element. An ultrasonic vibration pump is coupled to the gas bearing for providing pressurized gas to the gas bearing, and a sealed housing encloses the gas bearing and the ultrasonic vibration pump. Also described is a reaction wheel assembly for a spacecraft. The reaction wheel assembly includes a reaction wheel and the bearing assembly for stabilizing rotation of the reaction wheel.

16 Claims, 11 Drawing Sheets

(56) References Cited

FOREIGN PATENT DOCUMENTS

WO      2009/112866 A1     9/2009

OTHER PUBLICATIONS

Canadian Examination Report for Canadian Application No. 3,139,423, dated Mar. 30, 2023, 7 pgs.
Extended European Search Report for EP 20210368.5 dated May 26, 2021, 8 pgs.
Rossini, L. et al., "Analytical and Experimental Investigation on the Force and Torque of a Reaction Sphere for Satellite Attitude Control", 2011 IEEE/ASME International Conference on Advanced Intelligent Mechatronics (AIM2011) Budapest, Hungary, Jul. 3-7, 2011, 6 pgs.

\* cited by examiner

GAS BEARING SYSTEM

BACKGROUND

Technical Field

This application relates to bearing systems (bearing assemblies) for stabilizing rotation of a rotatable element using one or more gas bearings. These bearing systems may be applied to, for example, attitude control actuators for spacecraft, such as reaction wheels, control moment gyroscopes, or reaction spheres.

Description of the Related Art

The support of rotating discs (or other rotating/rotatable objects) with low friction is a problem with numerous technical solutions. For terrestrial applications, these solutions are often journal bearings or rolling element bearings. For machinery that exceeds the operational envelope of these bearing types, static or dynamic fluid or gas bearings may be used. For special applications that require long lifetime, operate at high speeds, or do not allow for lubrication, active and passive magnetic bearings may be an alternative.

The peculiarities of space make the bearing choice in spacecraft difficult. Commonly encountered requirements relate to maintenance-free operation for more than a decade, tolerance against degradation of fluid lubricants due to outgassing, radiation, and other effects, need for low friction caused by limited electrical power, and robustness against the high loads that the bearing has to sustain during the launch of the spacecraft. The requirements for reaction wheels that control the attitude of a spacecraft are even more challenging. A key contributor is the high number of revolutions, which can easily exceed a billion. Moreover, modern spacecraft often feature sensitive scientific instruments, such as cameras or interferometers. These instruments require a spacecraft with a high pointing accuracy and low (micro-)vibration levels. State-of-the-art reaction wheel technology is mainly based on rolling element bearings.

Despite their widespread use for reaction wheels, ball bearings have a number of disadvantages:

The tribological contact between rolling elements (e.g., balls), raceways and cage requires constant lubrication. The availability of lubricant must be assured throughout the wheel lifetime without possibility of manual intervention. Necessary re-lubrication systems increase the system complexity. Even though constant lubrication may reduce the wear on tribological contacts, lifetime remains limited.

The small contact area between raceways and rolling elements leads to high Hertzian contact pressures. Ball bearings are consequently sensitive to overload conditions which could deform either the rolling elements or the raceways.

Ball bearings provide little mechanical damping through their direct ceramic-to-metal or metal-to-metal contact, therefore transmitting unwanted mechanical vibrations.

Manufacturing tolerances of rolling element bearings cause unwanted mechanical vibration and noise.

Rolling element bearings can show unwanted behavior caused by interaction between the ball bearing cage and the rolling elements. This unwanted behavior causes high levels of bearing noise and increase in friction. The onset of this effect is potentially random and consequently hard to predict.

The lubrication function of the liquid lubricant is only guaranteed above a threshold speed of approximately 200 rpm. Therefore spacecraft operators have to make sure that the wheels run above that threshold and avoid speed reversals. This is constraining the operability of satellites and space probes.

Thus, there is a need for improved bearing systems (bearing assemblies) for stabilizing rotation of rotatable elements, especially aboard a spacecraft (such as a satellite or space probe, for example). There is further need for such bearing systems that have low complexity, low mechanical disturbances, long lifetime, and/or good dynamic behavior. There is further need for such bearing systems that allow for simple implementation of a launch lock and/or that are operable at low rotational speeds.

BRIEF SUMMARY

In view of some or all of these needs, the present disclosure proposes a bearing assembly and a reaction wheel assembly as described herein.

An aspect of the disclosure relates to a bearing assembly. The bearing assembly may be suitable for, or used for, stabilizing rotation of a rotatable element. The rotatable element may also be referred to as a rotating element. The rotatable/rotating element may be a rotating element for a spacecraft, for example. The bearing assembly may include a gas bearing acting as a bearing for the rotatable element. The gas bearing may be a static gas bearing, for example. The bearing assembly may further include an ultrasonic vibration pump coupled to the gas bearing. The ultrasonic vibration pump may be adapted for providing pressurized gas to the gas bearing. The bearing assembly may further include a sealed housing enclosing the gas bearing and the ultrasonic vibration pump. The sealed housing may be hermetically sealed. Hermetically sealed may mean airtight/gastight or pressure-tight. The sealed housing may further enclose the rotatable element. Further, the sealed housing may be filled with a gas (e.g., air, helium, etc.).

Configured as described above, the proposed bearing assembly does not require fluid lubricant. Compared to a conventional ball bearing, the bearing assembly has very low vibration and noise emission. If necessary, it is operable at very low rotations speeds and has sufficiently long lifetime for space applications. Compared to magnetic bearings (both active and passive), the proposed bearing assembly is of low cost and low complexity. Finally, the proposed bearing assembly has excellent dynamic behavior and allows for avoiding resonances in the bearing forces by dynamic adaptation of bearing stiffness.

In some embodiments, the bearing assembly may further include a control unit for controlling operation of the ultrasonic vibration pump. The control unit may be adapted to control a power that is supplied to the ultrasonic vibration pump depending on a rotation speed of the rotatable element. The power may be electric power. By controlling the power, the control unit may control the pressurization (e.g., pressure difference) that is applied by the ultrasonic vibration pump, in dependence on the rotation speed of the rotatable element. For instance, the control unit may be adapted to control the power that is supplied to the ultrasonic vibration pump in such manner that resonances between the gas bearing and the rotatable element (e.g., resonances in the bearing force(s)) are avoided. To this end, the bearing assembly may include a sensor for measuring the rotation speed of the rotatable element. Said sensor may be coupled to the control unit.

In some embodiments, the control unit may be adapted to control the power that is supplied to the ultrasonic vibration pump in such manner that higher pressurization is applied for rotating speeds below a predefined threshold and lower pressurization is applied for rotating speeds above the predefined threshold. Thereby, the aforementioned resonances between the gas bearing and the rotatable element can be avoided.

In some embodiments, the power to be supplied to the ultrasonic vibration pump may be determined based on the rotation speed of the rotatable element, using a lookup table. The determination may be performed by the control unit.

In some embodiments, the ultrasonic vibration pump may be an ultrasonic membrane pump. Specifically, the ultrasonic vibration pump may be a piezoelectric membrane pump, for example. As such, it may be a displacement type pump or it may generate a standing wave with the inlet of the pump being located at a node of the standing wave and the outlet of the pump being located at an anti-node of the standing wave. Alternatively, the ultrasonic vibration pump may be of plunger coil/solenoid type, for example. Accordingly, an ultrasonic vibration pump suitable for the intended purpose can be implemented in simple and efficient manner.

In some embodiments, the ultrasonic vibration pump may include a valve without moving parts, such as a solid state valve, for example. Additionally or alternatively, an inlet of the ultrasonic vibration pump may be connected (coupled) to a particle filter.

In some embodiments, the gas bearing may act as a radial bearing for the rotatable element. Additionally, the bearing assembly may include one or more second gas bearings acting as axial bearings for the rotatable element. The one or more second gas bearings may be enclosed by the sealed housing. The second gas bearing(s) may be provided with pressurized gas by the aforementioned ultrasonic vibration pump or any additional ultrasonic vibration pump as mentioned in subsequent embodiments. Accordingly, the rotation of the rotatable element may be stabilized both in radial and axial direction.

In some embodiments, the gas bearing may be a spherical gas bearing. Having such gas bearing, the gas bearing assembly may be particularly suited for stabilizing rotation of a control moment gyroscope, allowing for swiveling motion thereof.

In some embodiments, the bearing assembly may further include at least one second ultrasonic vibration pump that is coupled to the gas bearing. The at least one second ultrasonic vibration pump may be enclosed by the sealed housing and may provide redundancy to the (first) ultrasonic vibration pump. The second ultrasonic vibration pump(s) may be coupled in parallel to the (first) ultrasonic vibration pump. Further, the second ultrasonic vibration pump(s) may have their own particle filter(s) in some implementations. Thereby, the risk of critical failure of the bearing assembly can be reduced.

In some embodiments, the bearing assembly may further include at least one third ultrasonic vibration pump that is coupled to the gas bearing. The at least one third ultrasonic vibration pump may be enclosed by the sealed housing and may be coupled in series with the (first) ultrasonic vibration pump. Thereby, the achievable pressurization may be increased. Notably, the bearing assembly may include both second and third ultrasonic vibration pumps for achieving both redundancy and higher pressures. This may result in two or more series connections of pumps being provided in parallel. Thereby, if the intended type of ultrasonic vibration pump is not capable of providing a given target pressurization, said target pressurization can still be achieved when providing a series connection of two or more ultrasonic vibration pumps. Needless to say, foreseeing such series connection(s) is not necessary if the intended type of ultrasonic vibration pump is capable of providing the target pressurization.

In some embodiments, a gas pressure in the sealed housing may be in the range from 10 kPA to 80 kPA.

In some embodiments, the sealed housing may be a flexible casing. This would help to reduce pressure increase inside the sealed housing upon an increase in operation temperature. Additionally or alternatively, the sealed housing may include a sealed joint.

In some embodiments, the rotatable element may be one of a reaction wheel for a spacecraft, a control moment gyroscope for a spacecraft, or a reaction sphere for a spacecraft. The spacecraft may be a satellite or space probe, for example.

Another aspect of the disclosure relates to a reaction wheel assembly for a spacecraft. The reaction wheel assembly may include a reaction wheel. The reaction wheel assembly may further include the bearing assembly according to the aforementioned aspect and any of its embodiments, for stabilizing rotation of the reaction wheel.

Further aspects of the disclosure relate to methods of operating or controlling the aforementioned bearing assembly, for stabilizing rotation of a rotatable element. In particular, such methods may include controlling operation of the ultrasonic vibration pump. Said controlling may involve controlling a power (e.g., electric power) that is supplied to the ultrasonic vibration pump depending on a rotation speed of the rotatable element. For instance, the controlling of the power that is supplied to the ultrasonic vibration pump may be performed in such manner that resonances between the gas bearing and the rotatable element (e.g., resonances in the bearing force(s)) are avoided. Specifically, the power that is supplied to the ultrasonic vibration pump may be controlled in such manner that higher pressurization is applied by the ultrasonic vibration pump for rotating speeds below a predefined threshold and lower pressurization is applied for rotating speeds above the predefined threshold. Further, the power to be supplied to the ultrasonic vibration pump may be determined based on the rotation speed of the rotatable element, using a lookup table.

It will be appreciated that apparatus features and method steps may be interchanged in many ways. In particular, the details of the disclosed apparatus (e.g., bearing assembly or reaction wheel assembly) can be realized by the corresponding method of operating the apparatus, and vice versa, as the skilled person will appreciate. Moreover, any of the above statements made with respect to the apparatus are understood to likewise apply to the corresponding method, and vice versa.

BRIEF DESCRIPTION OF THE SEVERAL VIEWS OF THE DRAWINGS

Example embodiments of the disclosure are explained below with reference to the accompanying drawings, wherein FIG. 1 schematically illustrates an example of a bearing assembly according to embodiments of the disclosure, FIG. 2A and FIG. 2B schematically illustrate an example of a sealed housing for the bearing assembly, according to embodiments of the disclosure, FIG. 3 schematically illustrates an example of a pump arrangement for the bearing assembly, according to embodiments of the disclosure.

DETAILED DESCRIPTION

Figure 1:
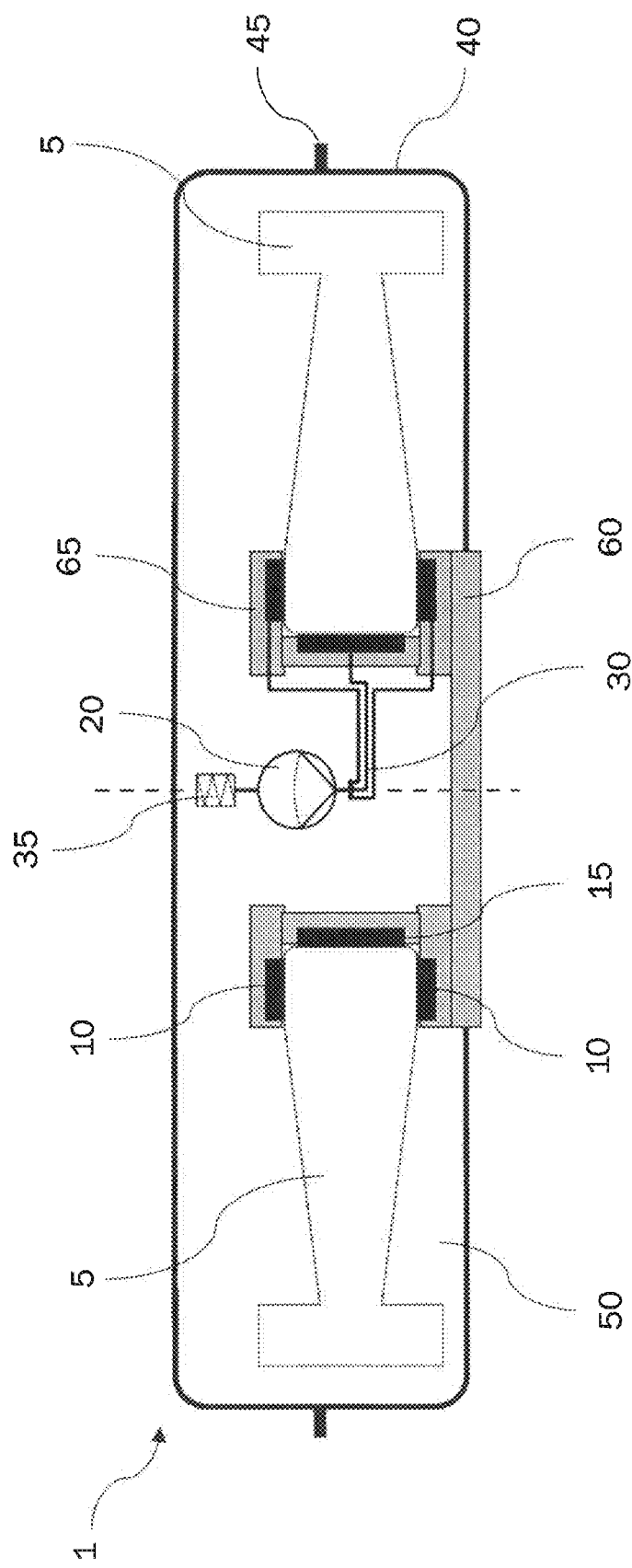

In the following, example embodiments of the disclosure will be described with reference to the appended figures. Identical elements in the figures may be indicated by identical reference numbers, and repeated description thereof may be omitted.

To overcome the aforementioned problems of rolling element bearings, a number of improvements are feasible. As a technical solution, a mechanical contact between rotor and stator should be avoided.

One possibility for avoiding mechanical contact lies in the use of Active Magnetic Bearings (AMBs). Systems based on Active Magnetic Bearings may have a number of advantages, such as frictionless motion, no wear and thus theoretical infinite mechanical lifetime, smooth movements, the possibility of electronic balancing through proper control strategies, and low vibration levels when appropriately designed. On the other hand, there are a number of disadvantages that limit the usefulness in space:

Complex mechanical and electrical design, requiring five actively controlled axes (three translations, two rotations). Tight integration of many different elements (sensors, actuators, cabling, magnets) is required on stator and rotor.

Proposed implementations have thus (multiple) single points of failures. Full redundancy would require an even more complex system.

Magnetic bearings, particularly those based on Lorentz forces, have a poor force-to-weight and force-to-power ratio. Consequently, systems tend to be bulky and heavy.

The aforementioned poor force-to-weight/force-to-power ratio makes operation under gravity conditions either difficult or impossible, negatively affecting testability.

The required control electronics are complex. Advanced features, such as electronic balancing, require significant computational power, resulting in an increased cost for the electronics.

Systems with active magnetic bearings require emergency touchdown bearings, often journal or ball bearings. In nominal operation, these unused components add additional weight and complexity.

Reaction wheel rotors must be additionally locked during launch to avoid rattling and damage.

Another possibility for avoiding mechanical contact lies in the use of passive (and semiactive) magnetic bearings. To reduce system complexity, some degrees of freedom can be supported by passive magnetic bearings. Because not all axes can be stabilized passively, at least one axis must be supported by other means, such as an active magnetic bearing. Even though the system is less complex, there are also disadvantages compared to the fully active AMB solution:

Damping of the passively stabilized axes is poor, leading to pronounced mechanical resonances.

For the passive axes, electronic balancing is impossible, hence a major source of exported vibrations persists.

Many disadvantages of fully active magnetic bearing systems also apply for semi-active arrangements, including the need for emergency touchdown bearings, single point of failures, and additional locking devices for launch.

Another possibility for avoiding mechanical contact lies in the use of passive superconducting bearings. In contrast to passive magnetic bearings, superconductors exert a stable behavior when subjected to a magnetic field. This physical property enables passive levitation without the need for an active control system. Despite their apparent simplicity, passive superconducting bearings have a number of significant drawbacks:

The superconducting effect is only present at very low temperatures (typically at or below 70K). Cooling the bearing down to such low temperatures requires large amounts of energy, even with good thermal insulation.

Cooling requires a cryocooler, which is itself a complex mechanical device with moving parts and thus limited lifetime and emission of vibration.

The system requires a dedicated rotor launch lock, as well as a holding/releasing mechanism that supports the rotor when the superconductor is not at operation temperature.

Despite its apparent simplicity, the required cooling and auxiliary systems make the overall device highly complex.

Another possibility for avoiding mechanical contact lies in the use of dynamic gas bearings. Gas bearings allow a contactless support using gas as medium in between a static and rotating part. A high relative surface speed between rotor and stator is required to allow for a pressure build-up that separates both surfaces. Solid friction occurs at low rotation speeds, making it unsuitable for reaction wheels with frequent zero-crossings.

This issue may be addressed by providing a twin rotor design, in which a small inner rotor is driven by an electric motor and runs at high speeds to allow for a constant relative movement between the outer rotor and the stator, effectively maintaining a separation between both. The characteristics and shortcomings of a dynamic gas bearing are the following:

Zero-crossings are impossible without touchdown, unsuitable for reaction wheels (at least for a single rotor design).

Difficult start up—high motor torque required to overcome solid friction, risk of wear and debris.

Twin rotor design: higher vibration levels caused by two rotating shafts.

Yet another possibility for avoiding mechanical contact lies in the use of hydrodynamic fluid film bearings. This concept is similar to the concept of hydrodynamic gas bearings, except for that the medium is a fluid instead of a gas. Hydrodynamic fluid bearings also require a minimum speed for nominal operation. This solution has the following disadvantages:

Solid friction during start-up.

Controlling fluids under low-gravity conditions is challenging.

Higher friction (compared to magnetic or gas bearings).

As a potential advantage, the solution may be more robust against launch vibrations.

The present disclosure addresses the aforementioned issues and shortcomings. Broadly speaking, the present disclosure lies in the technical field of bearing systems and the control thereof. Specifically, a bearing assembly (or bearing system) is disclosed that comprises a (static) gas bearing, an ultrasonic micropump, and a hermetically sealed housing. In some implementations, the micropump consists of a vibrating membrane oscillating at ultrasonic frequencies, driven by an actuator. In such micropumps, the oscillating membrane creates a standing wave of gas pressure. The pump inlet is located at a gas pressure node, whereas the pump outlet is located at a pressure antinode. Backflow can be avoided through a valve at the pump outlet. A hermetically sealed housing contains both bearing system and ultrasonic pump in a gaseous atmosphere.

The disclosure further proposes a method for vibration reduction of a rotating object (rotatable element). The method may alter the gas bearing's stiffness by changing the pump outlet pressure to minimize the dynamic interactions between stator, bearing, and rotor.

In one embodiment relating to a flywheel, the proposed bearing system is an integral component in a reaction wheel or control moment gyroscope usable for controlling orientation of a spacecraft.

In more detail, the present disclosure proposes a bearing system with low mechanical noise and excellent lifetime. Its distinct features make it particularly suited for use in spacecraft attitude control actuators, for example reaction wheels, momentum wheels, control moment gyroscopes, or reaction spheres. The disclosure is based on three main elements: a bearing assembly (bearing system) including a (static) gas bearing, an ultrasonic vibration pump (e.g., ultrasonic membrane pump), and a hermetic enclosure.

A schematic overview over an example of a bearing assembly 1 according to embodiments of the disclosure is illustrated in FIG. 1. The bearing assembly 1 is suitable for stabilizing rotation of a rotatable element 5 (such as, for example a reaction wheel or a control motion gyroscope). The bearing assembly 1 comprises a gas bearing (or gas bearings) 10, 15 acting as a bearing for the rotatable element 5, an ultrasonic vibration pump 20 coupled to the gas bearing 10, 15, for providing pressurized gas to the gas bearing 10, 15, and a sealed housing 40 enclosing the gas bearing 10, 15 and the ultrasonic vibration pump 20. The gas bearing 10, 15 may be a static gas bearing. It may comprise one or more (e.g., two) axial gas bearings 10 and a radial gas bearing 15 that support the rotatable element 5. A small clearance (e.g., ≈5 μm) between rotor (i.e., rotatable element 5) and stator ensures a free rotor movement. The gas bearings 10, 15 may be supported by a (precisely machined) support structure 65.

The gas bearing 10, 15 is supplied with a gas (e.g., air or helium) through tubes or pipes 30 driven by the ultrasonic vibration pump 20. The ultrasonic vibration pump 20 may be an ultrasonic membrane pump, for example, such as a piezoelectric membrane pump. It may be a displacement type pump or it may generate a standing wave with the inlet and the outlet of the pump being located at a node and an anti-node of the standing wave, respectively. Alternatively, the ultrasonic vibration pump may be of plunger coil/solenoid type, for example.

Low pressure, low viscosity gas 50 may enter the ultrasonic vibration pump 20 through a pump inlet. The pump inlet of the ultrasonic vibration pump 20 may be connected (coupled) to a particle filter 35 for removing possible contaminants (e.g., particles, debris). The particle filter 35 may thus also serve as inlet for the gas 50. The gas 50 is encased in the sealed housing 40, which may be a hermetically sealed, pressure-tight containment. Accordingly, hermetically sealed may mean airtight/gastight and/or pressure-tight. The sealed housing (casing) 45 may be opened for assembly, repair, or maintenance through a sealed joint 45. As shown in FIG. 1, the sealed housing 40 may also enclose the rotatable element 5.

The bearing assembly 1 together with the rotatable element 5 may be mounted, for example, to a spacecraft (e.g., a satellite or space probe) via a mounting base 60.

The rotatable element 5 may also be referred to as a rotating element. The rotatable/rotating element 5 may be a rotating element for a spacecraft, such as such as a reaction wheel, a control motion gyroscope, or a reaction sphere, as noted above.

In some implementations, the bearing assembly 1 may comprise the rotatable element 5. It is understood that the rotatable element 5 may be driven by an electrical drive system, which is not shown in the drawings.

Next, possible implementations of elements and certain aspects of the bearing assembly 1 will be described in more detail. It is understood that these possible implementations may likewise apply to bearing assemblies 2, 3 described later.

Gas Bearing

The present disclosure and the proposed bearing assemblies are independent of the specific technical realization of the gas bearing. For instance, the gas bearing may be realized using a porous material (such as described in patent documents JP-H08-6748 B2, JP-S52 92048 A or US 2016/363165 A1). Other gas bearing types that could be used in the context of the present disclosure are based on solid materials with micro-machined nozzles (such as described in patent documents US 2012/020596 A1 or CN 101490430 A). When a gas pressure is applied, the gas leaves through the pores or nozzles to generate a gas pressure at the rotor. The gas pressure increases when the gap between rotor and stator is small, leading to a total centering force. An appropriately designed gas bearing system ensures contact-free wheel operation throughout the entire wheel speed range. Here and at other instances throughout the present disclosure, "wheel" or "reaction wheel" may be used as a non-limiting example of the rotatable element 5.

The small working gaps of a few micrometers make gas bearing systems susceptible to thermal expansion. This is a particular concern for spacecraft equipment such as reaction wheels, which have to operate in temperature differences up to or exceeding 140° C. This problem can be mitigated by choosing materials with similar coefficients of thermal expansion (CTEs) for stator, gas bearings and rotor. Furthermore, materials with a low CTE can be used, for instance Carbon Fiber or Invar. When choosing a matching material proves difficult, this issue can also be tackled by designing the rotor and stator in a compliant manner.

Ultrasonic Vibration Pump

The gas bearing assemblies comprise (e.g., are driven by) an ultrasonic vibration pump (e.g., ultrasonic membrane pump), as an example of a micropump or piezoelectric pump. Examples of ultrasonic vibration pumps are described in patent documents U.S. Pat. No. 10,598,192 B2, WO 2009/112866 A1, EP 2312158 A1, and EP 2306019 A1. Manufacturers such as TTP Ventus Ltd. and Murata offer these micropumps as commercial off-the-shelf products. Possible realizations of ultrasonic vibration pumps have commonalties, but also differences. For example, ultrasonic vibration pumps, including those by TTP Ventus and Murata, may be based on an actuated membrane which vibrates at ultrasonic frequency (e.g., ≥20 kHz). The membrane is driven by piezo-actuators. As to potential differences, ultrasonic vibration pumps may be of a displacement-type pump design. Alternatively, the ultrasonic vibration pump may generate a standing gas wave. Then, the valveless inlet would be located at a pressure node of the standing wave, whereas the valved outlet would be located at the antinode in the center. It is understood that any of such or further ultrasonic vibration pumps may be used for the bearing assemblies according to embodiments of the disclosure.

Due to their very high operating frequency, ultrasonic vibration pumps are inaudible. Furthermore, the high oscillation frequency combined with the low membrane mass leads to a de-facto vibrationless pump behavior.

The valves may play an important role for the performance as well as the lifetime of a micropump. A possible example of a typical valve for micropumps comprises a moving polymer membrane, which is itself limited in lifetime (e.g., typically $10^{11}$ cycles). In order to be feasible, the valve lifetime must be increased to about 10 to 15 years of continuous operation. This may be achieved, for example by solid-state valves, which rely on simple non-moving nozzle structures. Because of the absence of moving parts, lifetime is in principle unlimited (even though efficiency may be lower than for moving valve structures). Accordingly, the ultrasonic vibration pump 20 (or any other ultrasonic vibration pump described throughout the disclosure) may comprise a solid state valve.

The driving electronics for piezoelectric pumps are comparably simple, as (only) a sinusoidal voltage of a certain frequency is required to drive the pump. The circuit may be based on a microcontroller, but due to its simplicity it is also possible to design the driving circuit using a small number of discrete electronic components. The low complexity of the driving electronics has positive effects on the price as well as the electronics' reliability. Example circuits for driving a piezoelectric pump are described in patent document GB 2577710 A. For example, the driving circuit may use an operational amplifier or an H-Bridge to drive the piezoelectric actuator(s).

As noted above, the ultrasonic vibration pump may also be implemented by a pump of plunger coil/solenoid type, for example.

Sealed Housing

For operation in vacuum conditions (e.g., in space), a hermetically sealed housing is required to maintain the working gas present throughout the lifetime of the spacecraft. Potential gas leakage can be avoided by reducing the number of flanges and parts to an absolute minimum. In any case, a sealed access lid is required to allow the assembly and repair of components inside the housing. After manufacturing and assembly, the access lid will be closed and sealed. Accordingly, the sealed housing 40 may comprise a sealed joint 45. The sealing system has to be designed to ensure negligible leakage throughout the lifetime of the spacecraft. Conceivable sealing systems could be O-ring gaskets, as well as soldered or welded connections.

A reaction wheel (or any other rotating element aboard a spacecraft) requires both electrical power as well as communication connections. These connections can be provided through sealed feedthroughs. As every feedthrough is a source for potential leakage, the number of connections should be limited to a minimum. Feedthroughs should also be designed for minimum leakage.

The sealed housing is a Single Point of Failure, since gas leakage will lead to a wheel failure. On the other hand, the sealing of a leak-tight sealing of a pressurized compartment is a standard problem (e.g., in pressurized tanks or feedthroughs in vacuum applications) with numerous technical solutions. In fact, many state-of-the art conventional reaction wheel products, using ball bearings, are located within a sealed housing. There are no reported cases of early reaction wheel failures due to housing leaks.

Figure 2A:
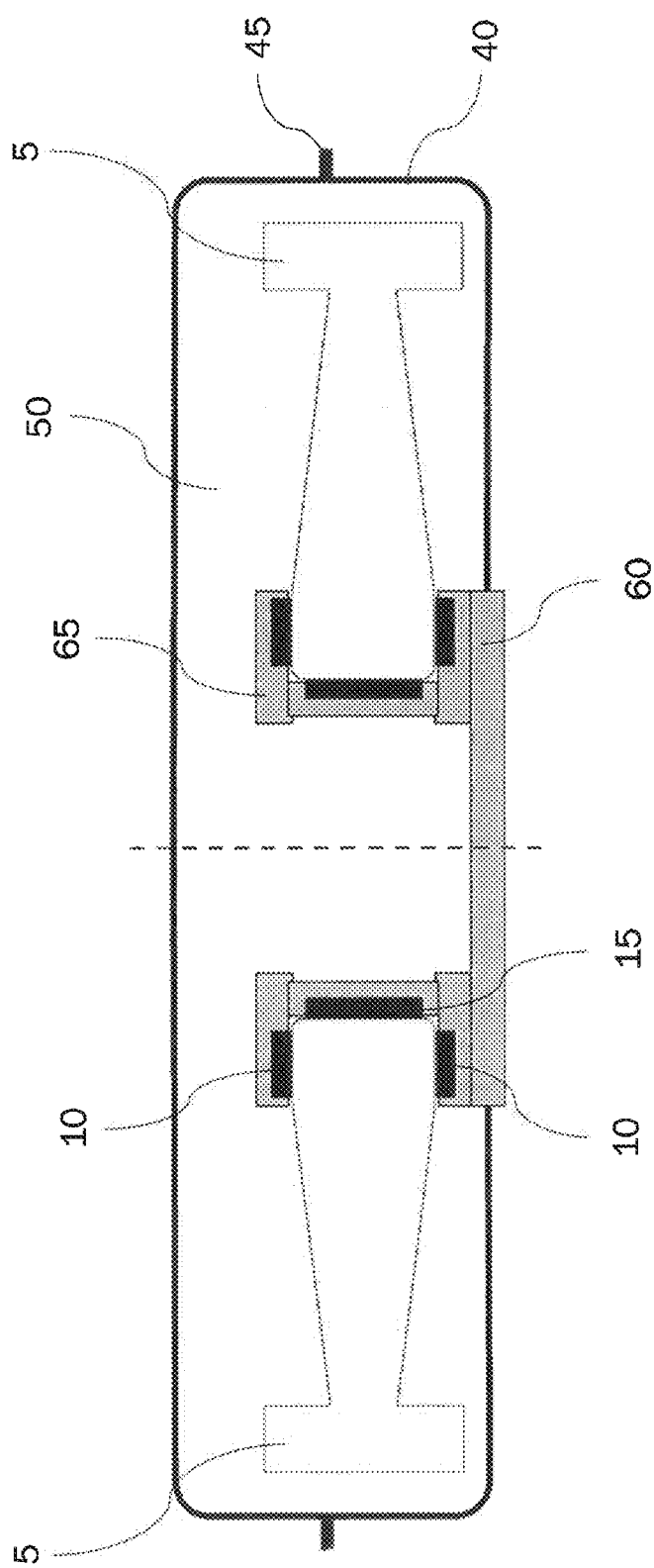
Figure 2B:
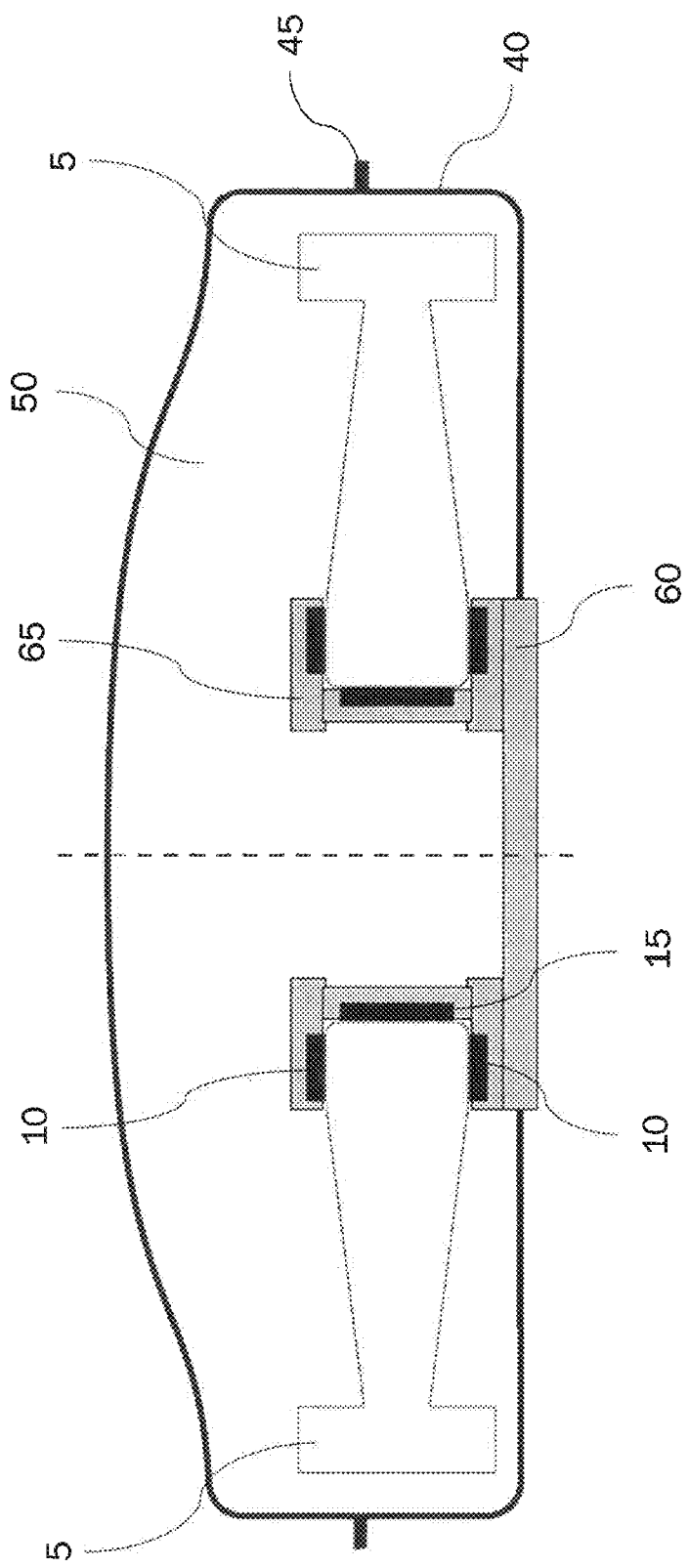

Typical equipment on spacecraft must operate in cold (e.g., about −60° C.) as well as in hot (e.g., about +80° C.) environments. Assuming that the volume of the enclosure is constant, a temperature raise from cold to hot would lead to about 68% increase in pressure. This pressure increase changes the system properties, such as drag losses or pump efficiency. To keep the pressure changes low, a flexible casing may be provided to allow a volume increase for keeping the pressure increase low. Accordingly, the sealed housing 40 may be or may comprise a flexible casing. This is shown in FIG. 2A and FIG. 2B, of which the former shows the flexible casing 40 at a nominal pressure (ambient case) and the latter shows the flexible casing 40 at a high pressure (hot case). Individual elements of the bearing assembly may be omitted in these figures, for reasons of conciseness. The volume increase allowed for by the flexible casing 40 reduces the pressure increase that would result from the increase in temperature.

Aerodynamic Losses

The majority of commercially available reaction wheels are either completely sealed and evacuated or have casings with orifices that allow gas exchange with the environment. Consequently, the majority of reaction wheels operate under vacuum conditions in space. An advantage of this configuration is the complete absence of aerodynamic drag losses.

Embodiments of the present disclosure rely on the presence of a gaseous atmosphere for the gas bearings, consequently drag losses are unavoidable. Under standard atmospheric conditions, these losses may exceed 100 W for a large size wheel at full speed. These loss values are unacceptably high for space applications. The individual contributors to the total drag are the flywheel speed, the gas density and viscosity, the Reynolds number, and the flywheel shape. Each contributor can be tuned to reduce the total drag and thus the losses.

The first contributor is the flywheel speed, which should be chosen low to minimize losses. Furthermore, a gas with a low dynamic viscosity should be chosen, for instance helium. There is a positive correlation between the gas pressure and drag losses, hence a pressure reduction will lead to lower drag losses. From first estimates, absolute gas pressures between 10 kPa and 50 kPa would allow a significant loss reduction. Thus, in the bearing assemblies according to embodiments of the disclosure, the gas pressure in the sealed housing may be in the range from 10 kPA to 80 kPA, or preferably, in the range from 10 kPA to 50 kPA. A further aspect is the flow regime, which is characterized by the Reynolds number. A low Reynolds number corresponds to laminar flow, whereas a high Reynolds number leads to turbulent flow. For both low drag losses and low vibration emission, laminar flow should be preferred. Finally, the flywheel shape (or shape of applicable rotating element in general) can be optimized for minimal aerodynamic losses.

A reduction in gas pressure will not only reduce aerodynamic losses, but also reduce the absolute pressure at the pump inlet. Consequently, the required pump power increases for a given pump outlet pressure. Thus, there is a trade-off between aerodynamic losses and required pump power for an overall loss optimization. As described below the pressurization that is achievable can be increased by connecting multiple pumps in series.

Launch Lock

Launching a spacecraft causes intense levels of vibration through combustion instabilities or extreme acoustic noise. Conventional reaction wheels use either preloaded bearings or dedicated hard stops to avoid damage of flywheel or bearings. Magnetic bearing reaction wheels conceptually require relatively large clearances between rotor and stator (approximately 0.5 mm to 1 mm). To avoid damage through rattling, magnetic bearing reaction wheels require a device that holds the rotor in a fixed position.

Embodiments of the present disclosure have the advantage that the (static) gas bearing requires extremely small clearances of approximately 5 µm to 10 µm. These small clearances make damages due to launch vibration less likely, as the small gaps lead to comparably low relative speeds between rotor and stator. As an additional advantage, the contact area of the gas bearing between rotor and stator is very large, leading to low Hertzian contact pressures for the rotor-stator contact. It can be argued that both effects—small gaps and small Hertzian contact pressures—make an additional locking device potentially unnecessary, or at least very simple to implement.

Redundancy

High reliability of spacecraft equipment (or equipment in general) can either be obtained through a very high reliability of its subcomponents, or when this is not possible, through redundancy. The contactless operation of the static gas bearing make a failure unlikely, given that the required supply gas pressure is provided.

A potential single point of failure is the wheel housing, since a gas leak will eventually lead to a failure of the bearing system. On the other hand, the design of a leak-tight housing is a known problem and has been solved in different technology domains, and is therefore not of primary concern.

One subcomponent of the bearing assembly that may require special attention is the micropump. Its active elements, specifically the driven membrane and possibly the valve, are moving and have a non-negligible probability of failure. As noted above, the reliability of the valve can be greatly increased by replacing it with a solid-state valve (possibly at the cost of efficiency).

Figure 3:
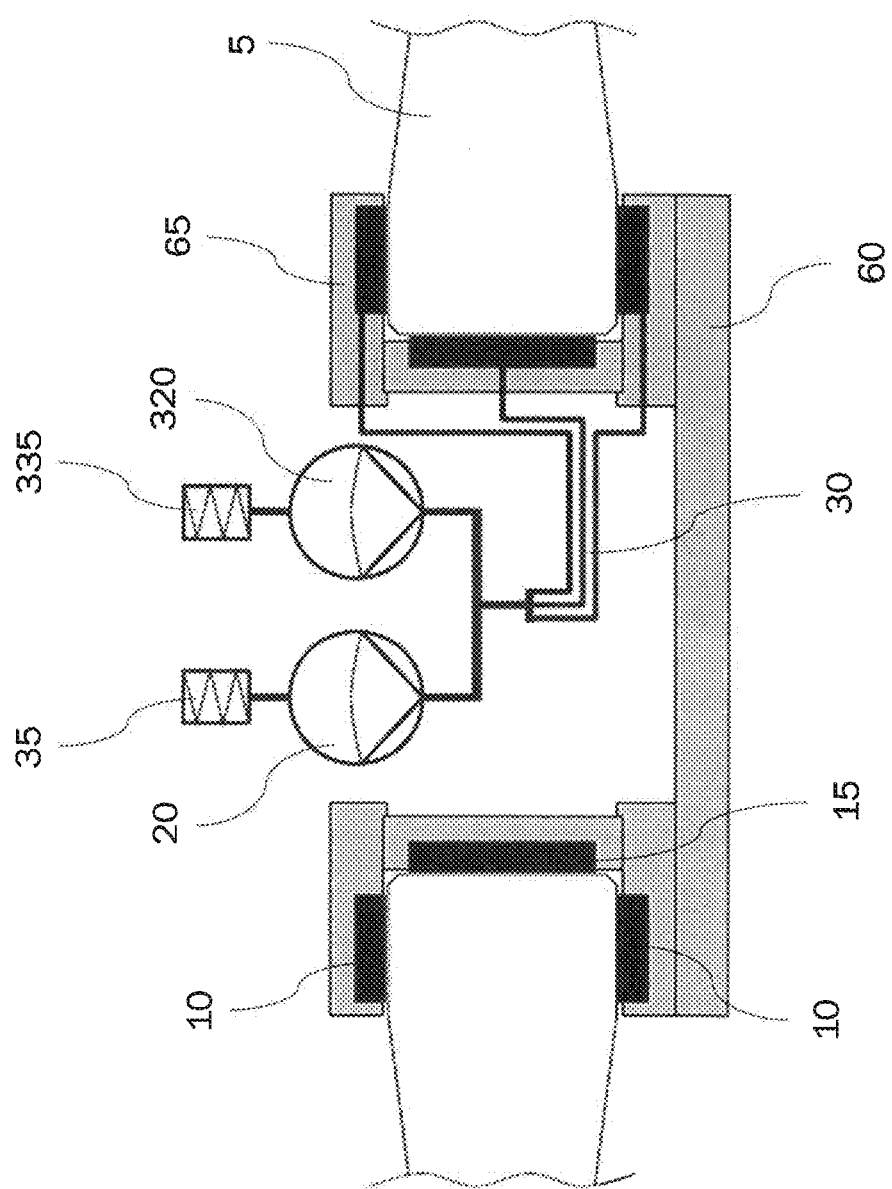

Another mitigation measure for potential pump failure is schematically shown in FIG. 3. Multiple ultrasonic vibration pumps 20, 320, if desired with individual input filters 35, 335, can be connected in parallel to mitigate the risk of a pump failure. Accordingly, the bearing assembly may comprise at least one second ultrasonic vibration pump (e.g., ultrasonic vibration pump 320 in FIG. 3) that is coupled to the gas bearing. This second ultrasonic vibration pump is also enclosed by the sealed housing (not shown in FIG. 3) and provides redundancy to the ultrasonic vibration pump 20. The second ultrasonic vibration pump(s) are coupled in parallel to the ultrasonic vibration pump 20. The second ultrasonic vibration pump(s) may have their own particle filter(s).

In case the main pump (e.g., ultrasonic vibration pump 20) fails, the redundant pump (e.g., ultrasonic vibration pump 320) may be powered to provide the required supply pressure (cold redundancy). Alternatively, both pumps can be active at the same time with only 50% of the total required capacity (hot redundancy).

In any of the above embodiments of the disclosure, additional ultrasonic vibration pumps may also be used to increase the achievable pressurization. This can be done by connecting (coupling) multiple pumps in series. In particular, if a single ultrasonic vibration pump is not sufficient for generating a desired pressurization, this can be addressed by providing a series connection of an appropriate number of ultrasonic vibration pumps. For providing redundancy, two or more series connections of ultrasonic vibration pumps may be provided in parallel.

That is, the bearing assembly may comprise at least one third ultrasonic vibration pump that is coupled to the gas bearing. This third ultrasonic vibration pump is also enclosed by the sealed housing and coupled in series with the (first) ultrasonic vibration pump.

Emergency Operation

An emergency operation is defined as a failure to deliver the required gas pressure while the rotor is still rotating. In this case, a rotor-stator contact will occur, and both bearing friction as well as aerodynamic drag will eventually stop the rotor. The bearing should be designed to withstand a limited number of rotor touchdowns. The materials and surface treatment for both bearing and rotor should be chosen so that wear and the risk of fretting are kept to a minimum. Enabling other ways to dissipate the rotor's kinetic energy, for example by active braking through the drive system, will contribute to minimize the impact of a touchdown on the rotor-bearing system. The most likely event that leads to a sudden emergency operation is the loss of external power or a software glitch. The risk of a sudden external power loss can be mitigated by using the electrical power generated by the spinning rotor and use this power for the pump operation. Thanks to the moderate pump power requirements, this should be possible down to very low rotational speeds. The risk of a software glitch leading to a driver-induced pump failure can be mitigated by a simple, software-independent driver circuit.

(Micro-)Vibration Management

One of the main advantages of the proposed bearing assembly is its very low emission of vibrations, compared to state-of-the-art ball bearings. First estimates suggest a ten- to hundred-fold reduction in vibration emission, for example when the proposed bearing assembly is used for a reaction wheel. Reasons for these good results are the avoidance of a direct rotor-stator contact as well as the excellent damping provided by the gas film combined with the comparably low bearing stiffness. The low bearing stiffness on the other end might lead to critical speeds, hence an unbalance-induced resonance, in the operation range.

Figure 4:
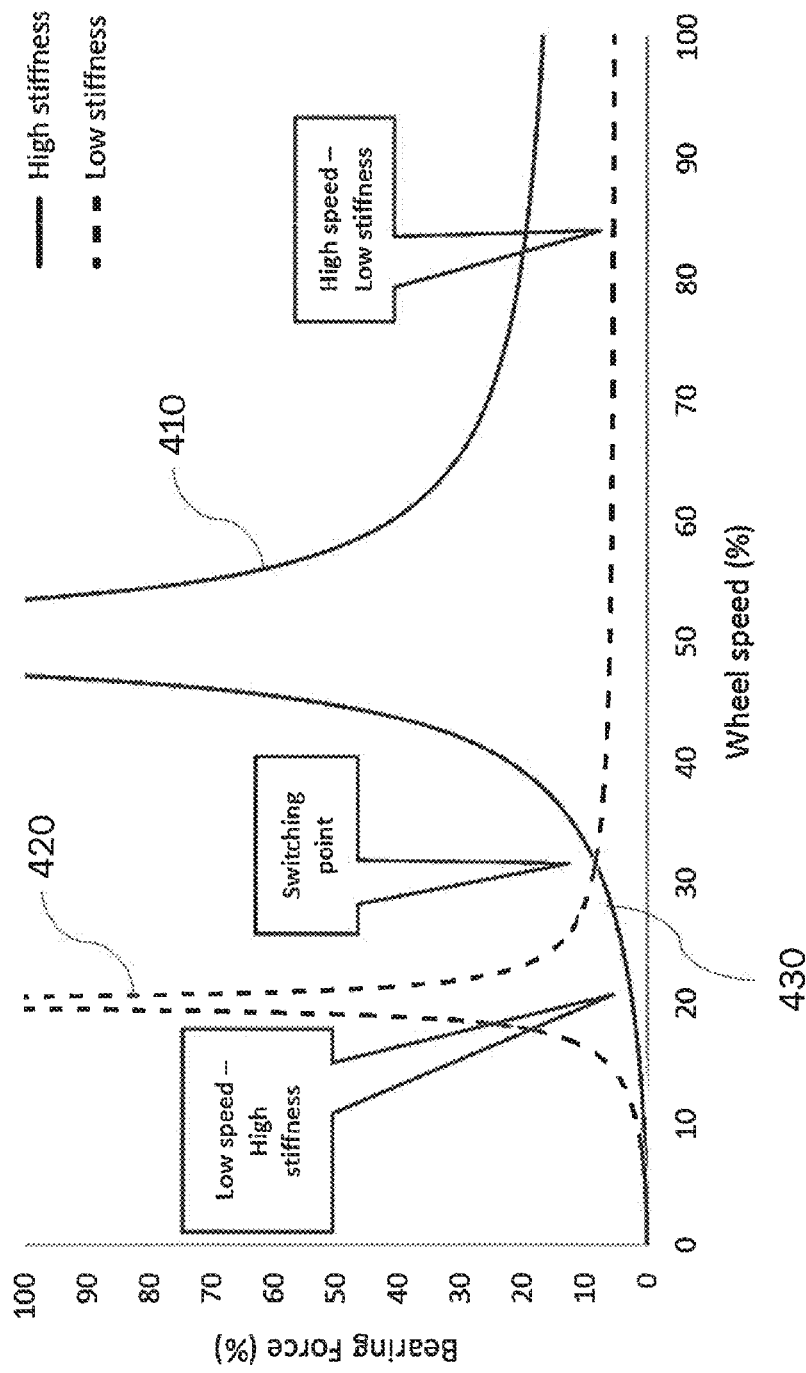
FIG. 4 is a diagram illustrating examples of bearing forces for different bearing stiffness of the bearing assembly, FIG. 5 schematically illustrates another example of a bearing assembly according to embodiments of the disclosure, FIG. 6 schematically illustrates yet another example of a bearing assembly according to embodiments of the disclosure.

FIG. 4 is a diagram showing bearing forces caused by unbalances as a function of wheel speed, for a flexible bearing. The location of the critical speed depends on the bearing stiffness. Graphs 410 and 420 indicate the bearing force as function of wheel speed for high and low bearing stiffness, respectively. The stiffness of a (static) gas bearing can be altered by changing the supply pressure. A higher supply pressure leads to a high bearing stiffness, conversely, lowering the supply pressure reduces the stiffness. The microvibration behavior can therefore be optimized by altering the pump power and hence the pump's outlet pressure with respect to the wheel speed.

Specifically, resonances of the bearing force can be avoided by appropriate change in pump pressure. At low rotation speeds, the pumps should generate high pressure for a high bearing stiffness (graph 410 in FIG. 4). At a certain point (in the example of FIG. 4 at approximately 30% wheel speed), the pump pressure should be lowered to follow the curve for low bearing stiffness (graph 520 in FIG. 4). The proposed method is not only limited to a simple switching between two pressures, but can involve a continuous pressure adaption, for instance through a look-up table. The proposed method has the advantage that the wheel (or rotatable element in general) can always be operated at the lowest vibration level.

In line with the above, the bearing assembly may comprise a control unit for controlling operation of the ultrasonic vibration pump(s) (i.e., the (first) ultrasonic vibration pump 20, and possibly the second and/or third ultrasonic vibration pumps, if applicable), wherein the control unit is adapted to control a power (e.g., electric power) that is supplied to the pump(s) depending on a rotation speed of the rotatable element. The control unit may be implemented by a digital controller, microcontroller (microprocessor), or any suitable type of computer (computer processor), for example. By controlling the power, the control unit may control the pressurization (e.g., pressure difference) that is applied by the ultrasonic vibration pump(s), in dependence on the rotation speed of the rotatable element. For instance, the control unit may be adapted to control the power that is supplied to the ultrasonic vibration pump(s) in such manner that resonances between the gas bearing and the rotatable element (e.g., resonances in unbalance-induced bearing forces) are avoided. As noted above, this may mean that the control unit is adapted to control the power that is supplied to the ultrasonic vibration pump in such manner that higher pressurization is applied for rotating speeds below a predefined threshold and lower pressurization is applied for rotating speeds above the predefined threshold. Therein, the respective amount of power to be supplied to the ultrasonic vibration pump(s) may be determined (e.g., by the control unit) based on the rotation speed of the rotatable element, for example using a lookup table. The predefined threshold may be chosen based on the occurrence of resonances in the bearing forces for high bearing stiffness and low bearing stiffness, typically between these resonances.

Further Embodiments and Implementations

Static air bearings can be manufactured in arbitrary shapes. For the proposed bearing configuration, a cylindrical radial bearing and a pair of flat bearing are used for axial rotor support, as shown in the example of FIG. 1.

That is, the gas bearing of the bearing assembly may act as a radial bearing for the rotatable element (e.g., reaction wheel). This corresponds to gas bearing 15 in FIG. 1. In such case, the bearing assembly may comprise one or more second gas bearings acting as axial bearings for the rotatable element. This would correspond to gas bearings 10 in FIG. 1. The one or more second gas bearings are enclosed by the sealed housing. The second gas bearing may be provided with pressurized gas by the aforementioned ultrasonic vibration pump(s) or any additional ultrasonic vibration pump(s). In alternative implementations, the gas bearing of the bearing assembly may act (only) as an axial bearing for the rotatable element, or (only) as a radial bearing for the rotatable element.

Figure 5:
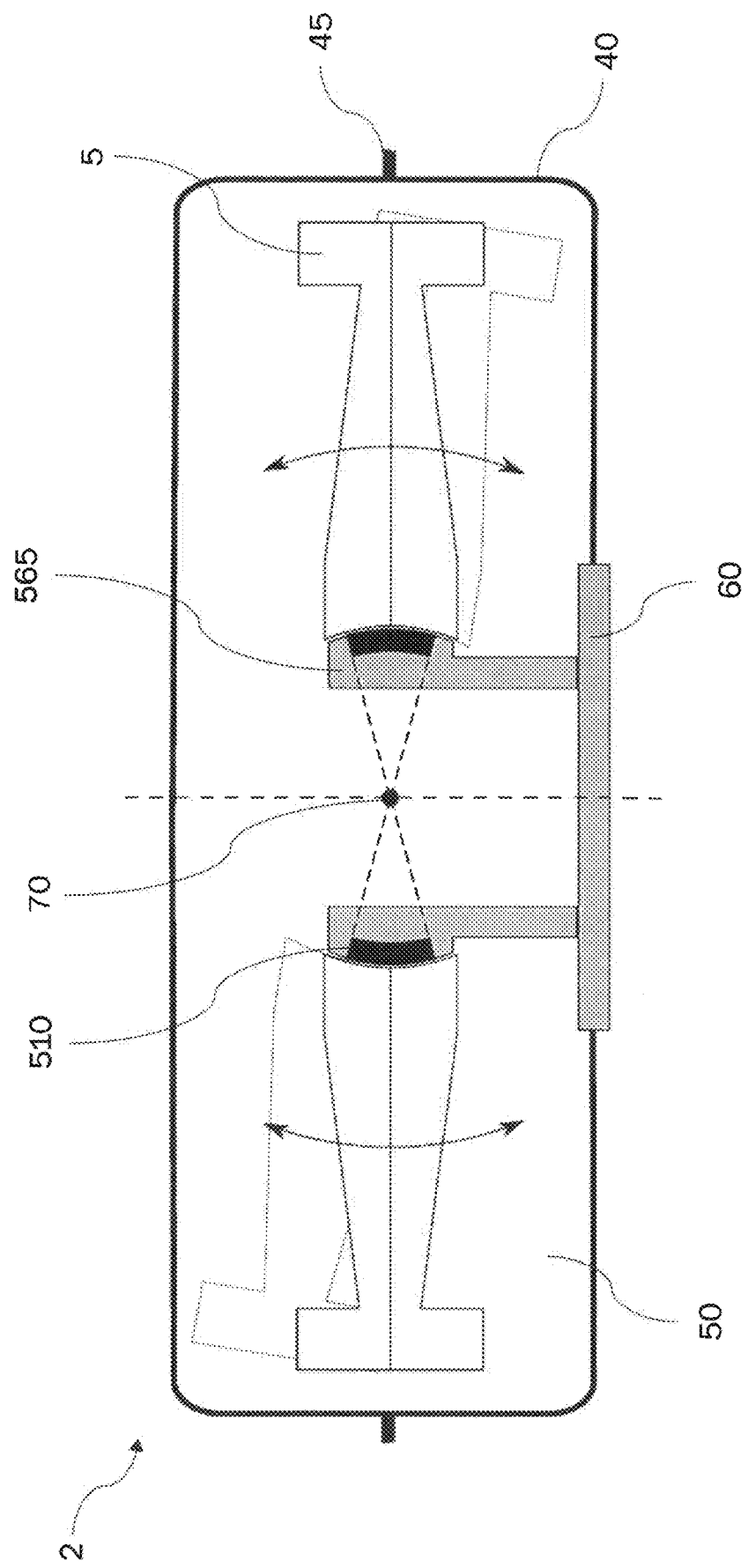
Figure 6:
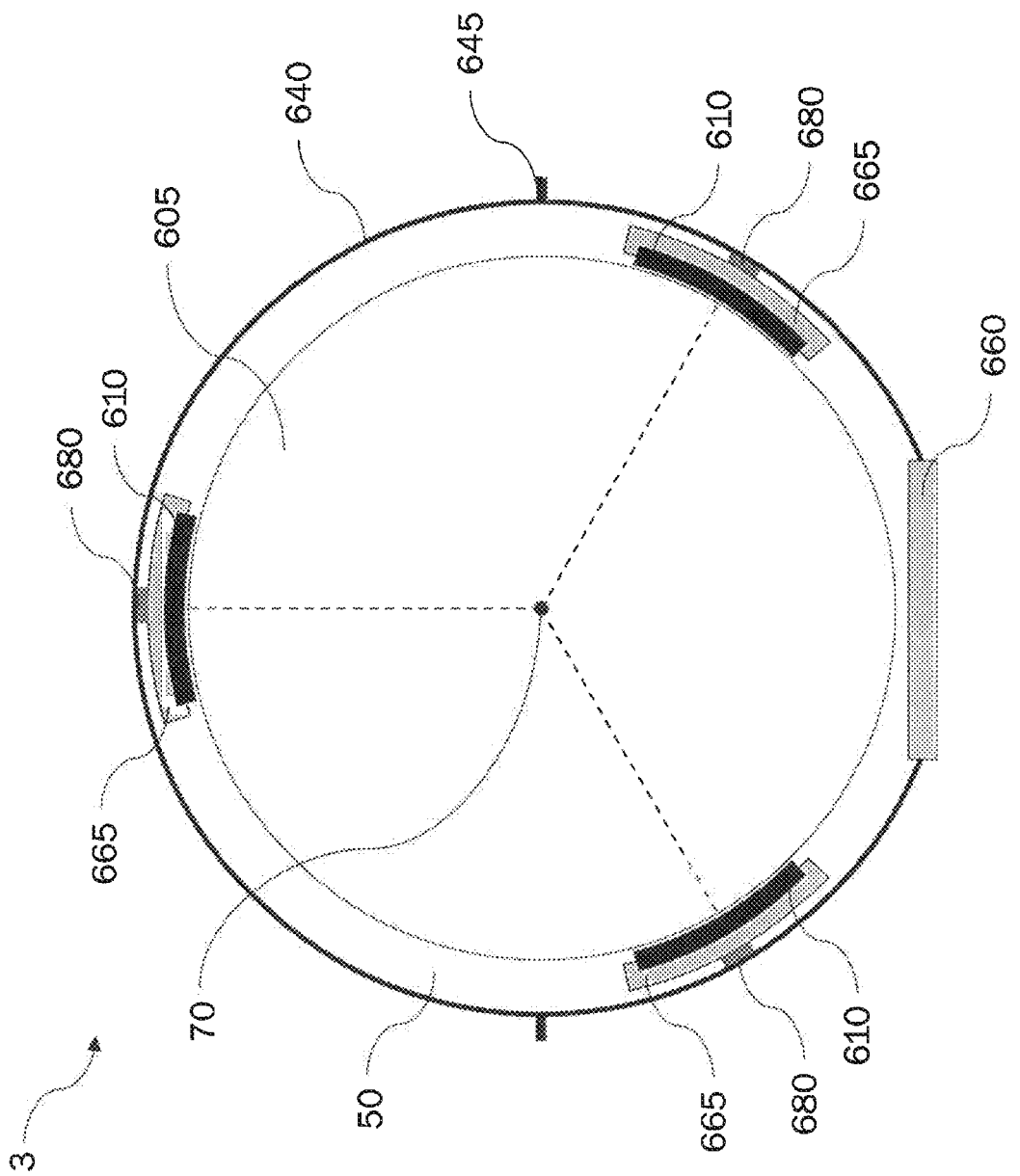

Alternatively, the gas bearing may be a spherical gas bearing. Such configuration is schematically illustrated in FIG. 5, which shows another example of a flywheel configuration. This time, the gas bearings 10, 15 are replaced by the (static) spherical gas bearing 510 that supports the rotor in axial and radial direction, as well as rotation about the flywheel principal axis of inertia (vertical, dashed line) around center point 70. Thereby, flywheel swiveling is allowed for. The spherical gas bearing 510 is supported by support structure 565. Otherwise, elements of the bearing assembly 2 of FIG. 5 may be identical to those of the bearing assembly 1 of FIG. 1. In particular, the pump and pipes may be omitted in FIG. 5 for reasons of conciseness. In contrast to the previous configuration, the present configuration allows for an additional rotational motion in two axes. Consequently, all the rotational axes are unconstrained. This setup is especially useful for the design and realization of a control motion gyroscope, as the gimballing of a rotating disc generates gyroscopic torques for spacecraft attitude control. Yet another alternative implementation is schematically illustrated in FIG. 6, which shows a bearing assembly 3 for a rotating sphere (e.g., reaction sphere) 605 instead of a flywheel. This time, the gas bearings 10, 15 are replaced by outer bearings 665 that are supported by support structure 680. The sealed housing 640 has a shape commensurable with the shape of the rotating sphere 605. Pumps, pipes, etc., may be omitted from FIG. 6 for reasons of conciseness and may correspond to those shown in FIG. 1.

One advantage of this implementation is the ability to accelerate and decelerate the sphere in any direction, allowing to control the attitude of a spacecraft in any direction with a single device. The concept of a drive and bearing system for a reaction sphere using magnetic forces is described in US 2014/0209751 A1. The present embodiment has the advantage of its simplicity, lightness, and energy efficiency. Furthermore, it allows for a large degree of freedom in design, since the choice of material for the sphere is almost completely unconstrained. The specific implementation of the motor for driving the reaction sphere is beyond the scope of the present disclosure. Motors feasible for this purpose are described for example in patent document US 2014/0209751 A1 and in L. Rossini, O. Chételat, E. Onillon, Y. Perriard, "Analytical and Experimental Investigation on the Force and Torque of a Reaction Sphere for Satellite Attitude Control," IEEE/ASME International Conference on Advanced Intelligent Mechatronics (AIM2011), Budapest, Hungary, Jul. 3-7, 2011. It is understood that the skilled person would select an appropriate motor for driving the reaction sphere depending on circumstances and requirements.

Further embodiments of the disclosure relate to a reaction wheel assembly for a spacecraft, comprising a reaction wheel and a bearing assembly as described above (e.g., the bearing assembly of FIG. 1) for stabilizing rotation of the reaction wheel. Further embodiments relate to a control motion gyroscope assembly for a spacecraft, comprising a control motion gyroscope and a bearing assembly as described above (e.g., the bearing assembly 2 of FIG. 5) for stabilizing rotation of the control motion gyroscope. Yet further embodiments relate to a reaction sphere assembly for a spacecraft, comprising a reaction sphere and a bearing assembly as described above (e.g., the bearing assembly 3 of FIG. 6) for stabilizing rotation of the reaction sphere.

Technical Advantages

Next, technical advantages of embodiments of the disclosure will be described. Therein, without intended limitation, reference may be made to a reaction wheel (or flywheel) as an example of the rotatable element supported by the bearing assembly.

The proposed bearing assembly and methods of operating the same offer a number of advantages over the current state of the art:

In contrast to a reaction wheels with ball bearings, no fluid lubrication is required, avoiding any problem stemming from lubricants. These problems are for instance: lubricant loss, evaporation, degradation, or creep. Furthermore, no lubrication replenishment system is required, making the (static) gas bearing system less complex.

In contrast to a reaction wheel with ball bearings, gas bearings have excellent dynamic behavior. Transient effects present in ball bearings, for instance cage instability causing large vibration, are not present for gas bearings.

The vibration and noise emission of a reaction wheel with gas bearings is 10 times to 100 times lower than the emission of a ball bearing reaction wheel.

Ball bearings are prone to show friction torque instabilities, for example caused by an irregular distribution of liquid lubricant. This effect may impair the spacecraft pointing stability. Friction torque noise is absent in gas bearings, leading to a better spacecraft pointing stability.

Conventional reaction wheels based on ball bearings cannot be regularly operated at low rotation speeds between +/−200 rpm, since this would increase wear and reduce lifetime. Also friction torque instabilities increase in that speed range. This has consequences on the operation of satellites since the effective momentum capacity is reduced by half. These effects do not occur in gas bearings so that the full momentum range can be used. Thereby, the fine-pointing capability of satellites is less often (typically by a factor of one half or less) impaired when gas bearings are used.

The lifetime of a gas bearing is practically unlimited due to the absence of physical rotor-stator contact. Consequently, the only critical element in proposed bearing assembly is failure of the micropump.

In contrast to magnetic bearing reaction wheels, the proposed gas bearing reaction wheel is considerably less complex to build, since the part count is lower, since the manufacturing requires standard tools and processes, and since the assembly process can be automated. Magnetic bearing reaction wheels on the other hand consist of many different, tightly integrated subsystems, whose assembly is difficult to automate.

The electronics for the micropump are considerably less complex than those for a magnetic bearing reaction wheel, as the latter ones require a closed-loop control system for five axes.

Due to low rotor-stator clearances, a potential launch lock (if needed) is easier to realize than for a magnetic bearing reaction wheel.

All points mentioned above will lead to a significantly lower cost than that of a magnetic bearing reaction wheel.

It is anticipated that the proposed gas bearing reaction wheel will be lighter than a comparable magnetic bearing reaction wheel.

It is anticipated that the vibration performance of a gas bearing reaction wheel is comparable to that of a magnetic bearing reaction wheel.

Many scientific satellites and space-probes are equipped with ultra-sensitive magnetometers. Any magnetic distortion stemming from the spacecraft will impair the results. It is therefore important to minimize the magnetic fields stemming from the reaction wheels (or any other rotating elements). The proposed gas bearing system in combination with an ultrasonic pump does not emit any magnetic distortion, which is a considerable advantage over magnetic bearing reaction wheels.

Electronic unbalance cancellation, as done in a magnetic bearing reaction wheel, may not be possible with a gas bearing reaction wheel. Nevertheless, precision balancing and dynamic bearing stiffness adaption through a modulation of the pump power and pressure according to embodiments can reach comparable vibration reductions.

Technical Results

Next, technical results of embodiments of the disclosure will be described. In order to demonstrate the feasibility and main technical advantages of the use of gas bearings for reaction wheels (or other rotating/rotatable elements), a full-scale prototype has been designed and manufactured. The prototype features one radial air bushing and one axial air bearing, a monolithic flywheel, a commercial brushless DC motor, an incremental encoder, a 3D printed bottom plate, and a printed circuit board equipped with a motor driver, micropumps, and electrical interfaces.

The prototype is designed to deliver an angular momentum of 24 Nms at 6000 rpm, which is in line with the performance needs of typical mid-to-large size spacecraft platforms, used for example for Earth observation, astronomy, or navigation.

During a first test phase, the rotor has been operated up to a maximum of 5,800 rpm to study the general characteristics of the wheel. In addition, the functionality of the micropumps has been tested and verified. In a first test run, the axial bearing is pressurized with 1.2 bar, whereas the radial bearing is pressurized with 0.6 bar of pressurized air. The flywheel has been accelerated using the built-in commercial brushless DC motor. When a speed of approximately 5,800 rpm had been reached, the motor had been switched off and the flywheel had been let to coast-down using the atmospheric drag acting on the fly-wheel as well as the drag within the air bearings themselves. The test was primarily used to verify that the air bearings are capable of carrying the load of the rotor and that there is no physical contact between any solid parts. Since there was no audible noise during the coast down (e.g., no grinding, no clicking, not even any perceivable noise due to air swirls), the load-carrying function of the bearings has been demonstrated.

Figure 7:
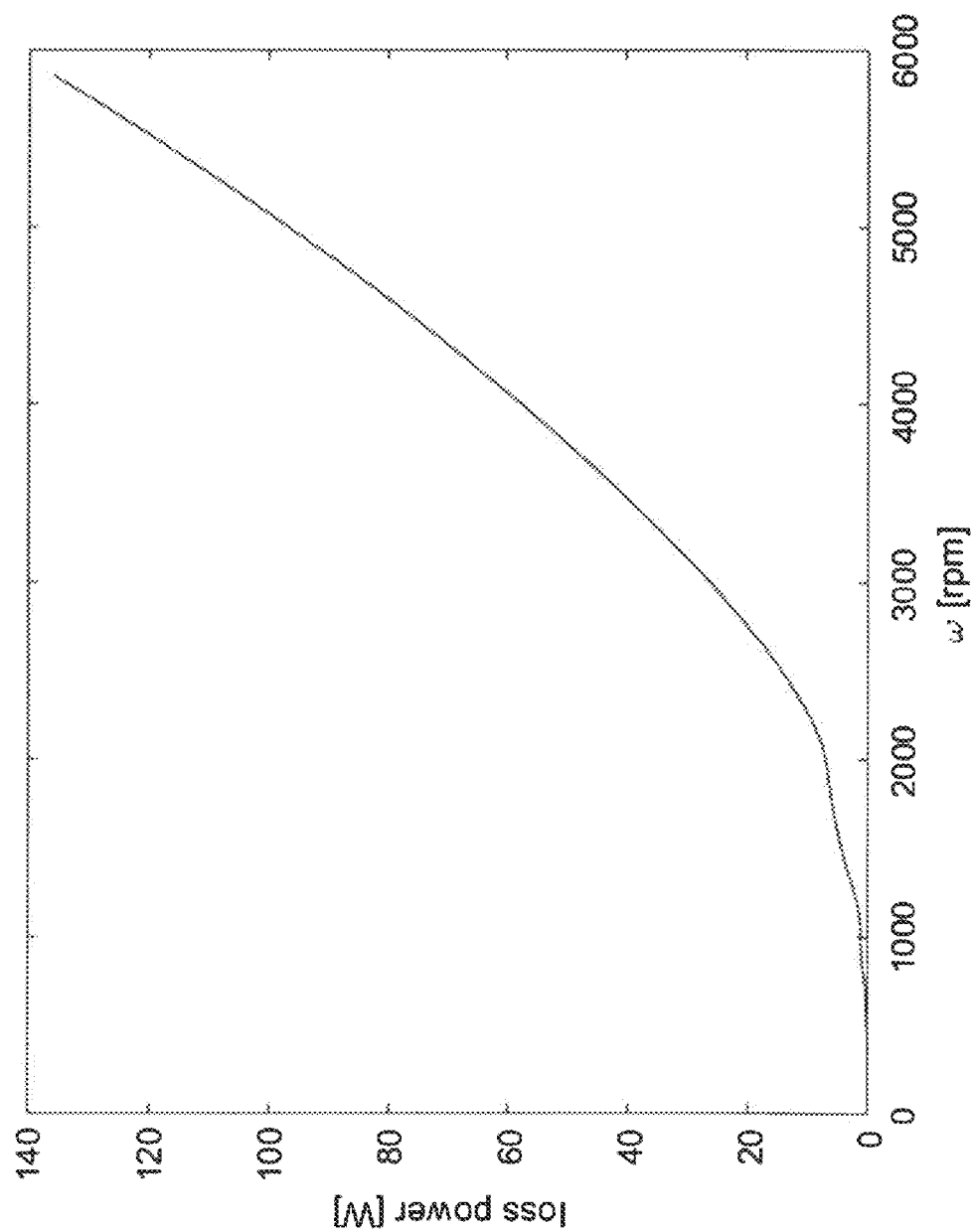
FIG. 7 is a diagram illustrating an example of a loss power vs. speed relationship for a bearing assembly according to embodiments of the present disclosure.

Conclusions regarding the overall losses can be drawn by analysis of the speed signal during the coast-down. In total it took about 12 minutes to decelerate the rotor from 5,800 rpm to just below 400 rpm. According to the fundamentals of fluid dynamics, losses are expected to increase non-linearly with speed. The test data shown in FIG. 7 confirm a non-linear loss-curve. The peak loss power reaches 135 rpm at maximum speed, whereas below 2,500 rpm losses are already reduced to below 20 W.

Another point of interest is microvibration. In order to characterize the vibrations emitted during operation of the air bearing, the prototype has been installed on a 6-axis dynamometer. This device is capable of measuring very small forces and torques with high precision and is standard for microvibration testing of reaction wheels. It has been found that the overall level of emitted vibration is very low. Along the x-axis, i.e., in radial direction, vibrations are dominated by the static unbalance of the rotor. A measured force of about IN at 5,800 rpm corresponds to an unbalance of 0.3 gcm, which is a typical value for balanced reaction wheel flywheels.

Figure 8A:
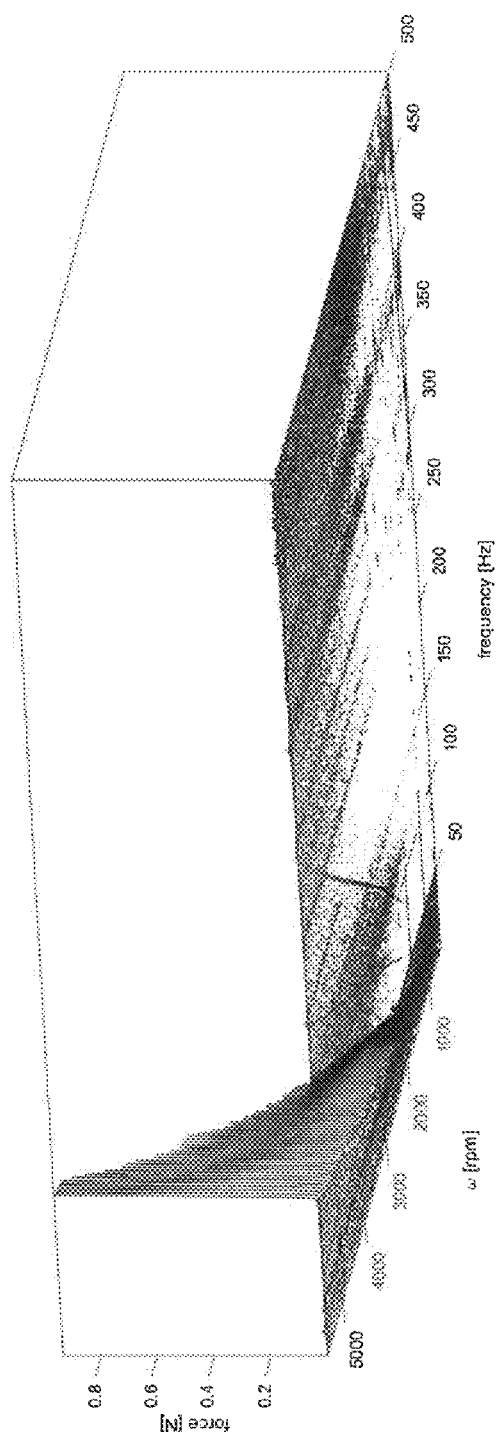
FIG. 8A, FIG. 8B, FIG. 8C, and FIG. 8D are diagrams illustrating microvibration spectrums for a bearing assembly according to embodiments of the disclosure and a conventional bearing assembly.
Figure 8B:
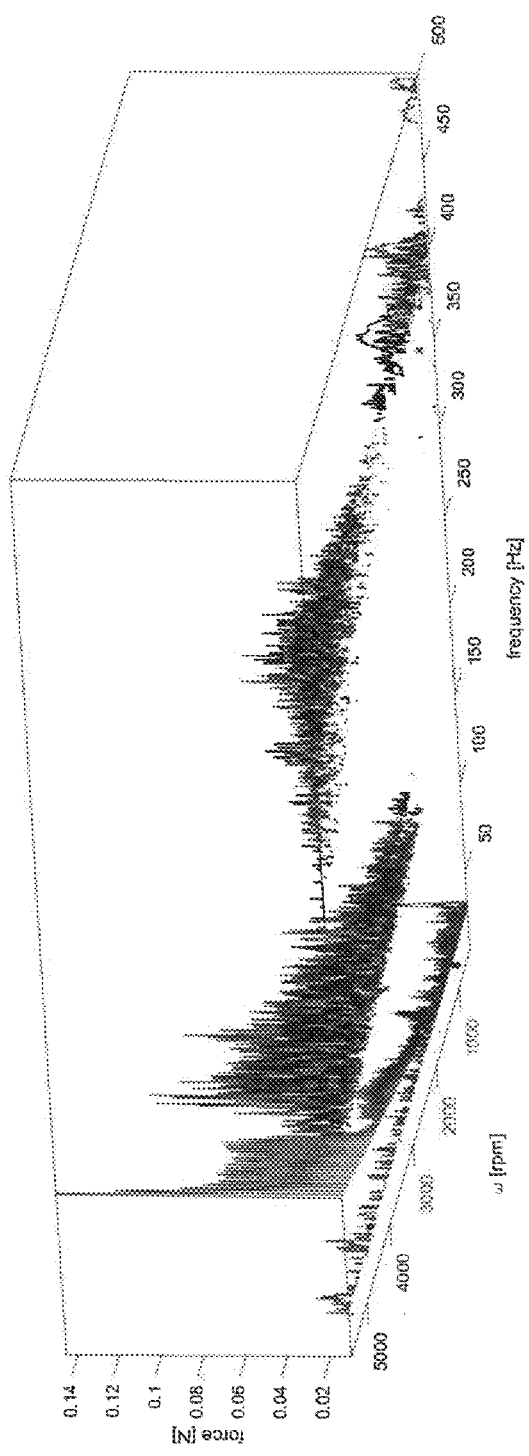
Figure 8C:
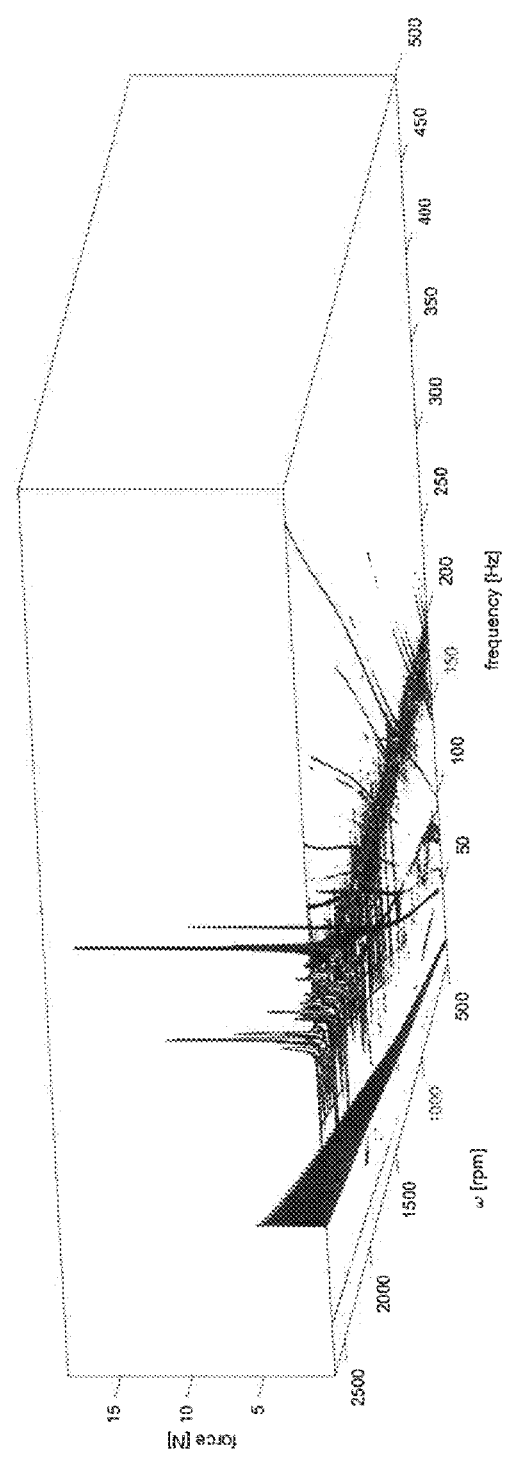
Figure 8D:
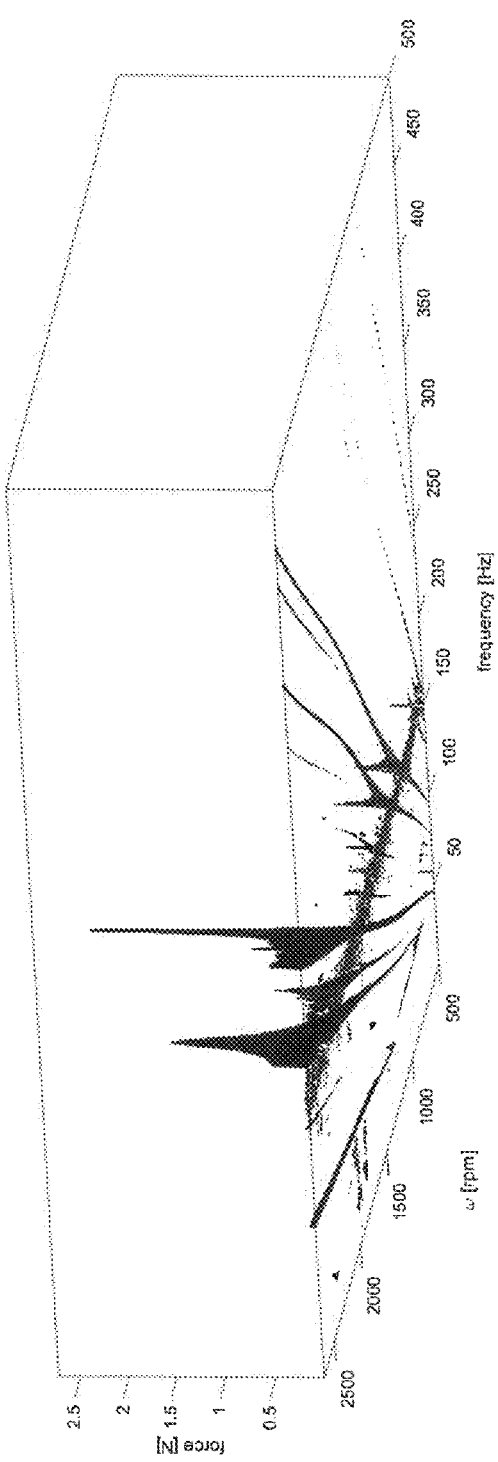

More importantly, it has further been found that there is no other major noise source within the spectrum of the recorded microvibration. To put this into perspective, the noise spectrum of a conventional reaction wheel, using ball bearings, is heavily dominated by the presence of ball bearing disturbances as well as mechanical resonances. FIG. 8A and FIG. 8B show the microvibration spectrum of a reaction wheel using the bearing assembly according to embodiments of the disclosure, in radial direction (x-axis) and axial direction (z-axis), respectively. FIG. 8C and FIG. 8D, on the other hand, show the typical microvibration spectrum in radial direction (x-axis) and axial direction (z-axis) for a conventional reaction wheel of similar size as the air bearing prototype, using ball bearings. As can be seen from these diagrams, resonances in the microvibration spectrum are essentially absent for the reaction wheel when using the bearing assembly according to embodiments of the disclosure. In fact, the peak value of emitted vibration of the air bearing prototype appears to be 20 times lower compared conventional reaction wheels due to the absence of ball bearing imperfections as well as resonances (within the sensitive frequency range).

Figure 9:
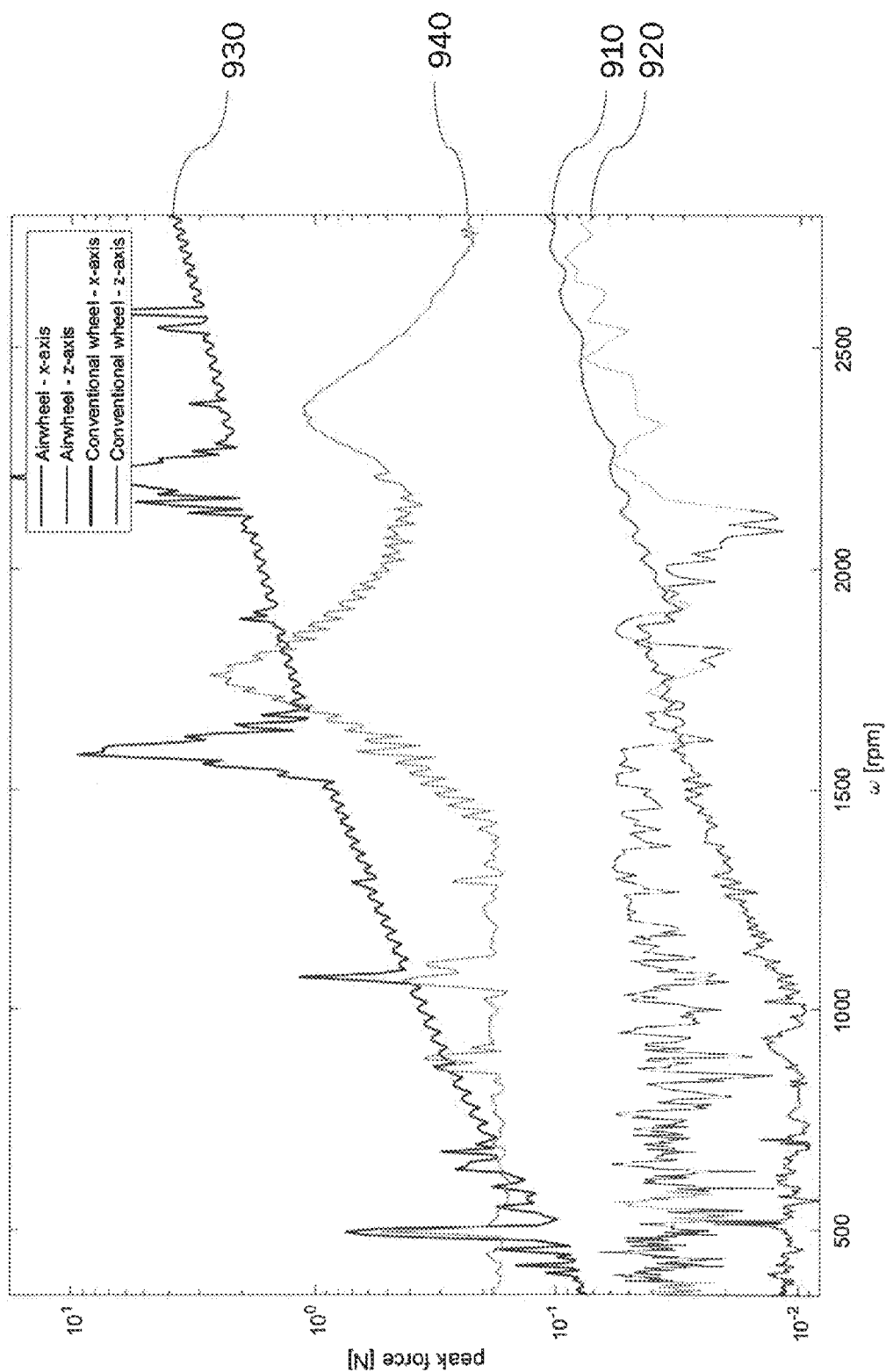
FIG. 9 is a diagram illustrating noise levels for a bearing assembly according to embodiments of the disclosure and a conventional bearing assembly.

A direct comparison between the noise levels of a conventional wheel and the air bearing prototype is given in FIG. 9. For the bearing assembly according to embodiments of the disclosure, graph 910 indicates noise levels along the radial direction (x- and y-axes), and graph 920 indicates the noise level in the axial direction (z-axis). For the conventional reaction wheel, graphs 930 and 940 indicate noise levels along the radial direction (x- and y-axes), and in the axial direction (z-axis), respectively. It can be seen that that vibration levels of the air bearing according to embodiments of the disclosure are by a factor of 10 to 30 below the ball bearing for radial directions (x- and y-axes) and by a factor of 5 to 20 below for the axial direction (z-axis).

Summary of Possible Implementations

A summary of possible implementations of embodiments of the present disclosure is given below. This summary is not to be understood in any way as complete or limiting.

An example implementation relates to a bearing system, comprising: a static gas bearing with up to three degrees of freedom, allowing the rotation or translation of an object with low friction. The gas bearing is connected through pipes or tubes to the outlet of an ultrasonic membrane pump. This pump is characterized by an actuated membrane vibrating at an inaudible, ultrasonic frequency. In contrast to displacement pumps, the proposed pump generates a standing wave of gas pressure in a cavity. The pump's gas inlet is located at a gas pressure node, whereas the pump's outlet is located at a pressure antinode. For a proper pump functioning, a check valve is required at the pump's outlet. This valve can be realized using moving parts, or can be of solid state. The pump's inlet features a filter that protects the pump from particles or debris.

In the above example implementation, for application in a vacuum, which is a typical condition for equipment on board of spacecraft, the gas bearing assembly and the pump are enclosed in a hermetically-sealed housing. The housing is filled with a pressurized gas to enable operation of the pump and the gas bearing. The housing is split to allow the assembly of the components. After assembly, the split housing is closed and sealed. The sealing system may, for instance, be performed by a flange with an O-Ring, a soldered or welded connection, or another sealing method. The housing may contain hermetically-sealed feedthroughs for electrical connections. Temperature changes can lead to significant, potentially unwanted changes in the absolute gas pressure inside the housing. These changes can be reduced by designing the pressurized vessel with a flexible housing, allowing a volume increase and thus lower absolute gas pressure changes.

Additionally or alternatively in the above example implementation, pump redundancy may be achieved by connecting (coupling) multiple pumps in parallel.

Another example implementation relates to a method for reducing the vibration signature of a rotating object in gas bearings by changing the bearing stiffness. The positive correlation between the stiffness of a static gas bearing and the gas supply pressure provided by the pump can be harnessed to reduce the vibration emission caused by unbalance. For certain combinations of rotational speed, the mass of the rotating object and the bearing stiffness, resonances causing large rotor deflections and bearing forces may occur. By modulating the pump pressure, the bearing stiffness changes, leading to an avoidance of the resonance situation. The proposed method defines an optimal bearing stiffness (and hence pressure) level for any rotational speed. These optimal pressure levels can be determined using analysis or tests and then stored in a look-up table. For each speed, the digital controller, microcontroller (microprocessor), computer (computer processor) or control unit in general may feed the optimal pump power and thus pressure levels to the ultrasonic pump.

Interpretation

It is understood that any control units or blocks described throughout the disclosure may be implemented by a digital controller, microcontroller (microprocessor), computer, computer processor or respective computer processors, or the like.

It should further be noted that the description and drawings merely illustrate the principles of the proposed apparatus (system) and method. Those skilled in the art will be able to implement various arrangements that, although not explicitly described or shown herein, embody the principles of the invention and are included within its spirit and scope.

Furthermore, all examples and embodiments outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

The various embodiments described above can be combined to provide further embodiments. All of the U.S. patents, U.S. patent application publications, foreign patents, foreign patent applications, and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bearing assembly for stabilizing rotation of a rotatable element in vacuum conditions, the bearing assembly comprising:
    a static gas bearing acting as a bearing for the rotatable element;
    an ultrasonic vibration pump coupled to the static gas bearing, for providing pressurized gas to the static gas bearing; and
    a sealed housing enclosing the gas bearing and the ultrasonic vibration pump,
    wherein the ultrasonic vibration pump comprises a pump inlet through which unpressurized gas enclosed in the sealed housing may enter the ultrasonic vibration pump.

2. The bearing assembly according to claim 1, further comprising a control unit for controlling operation of the ultrasonic vibration pump,
    wherein the control unit is adapted to control a power that is supplied to the ultrasonic vibration pump depending on a rotation speed of the rotatable element.

3. The bearing assembly according to claim 2, wherein the control unit is adapted to control the power that is supplied to the ultrasonic vibration pump in such manner that a higher pressurization is applied for rotating speeds below a predefined threshold and a lower pressurization is applied for rotating speeds above the predefined threshold.

4. The bearing assembly according to claim 2, wherein the power to be supplied to the ultrasonic vibration pump is determined based on the rotation speed of the rotatable element, using a lookup table.

5. The bearing assembly according to claim 1, wherein the ultrasonic vibration pump is an ultrasonic membrane pump.

6. The bearing assembly according to claim 1,
    wherein the ultrasonic vibration pump comprises a solid state valve; and/or
    wherein an inlet of the ultrasonic vibration pump is coupled to a particle filter.

7. The bearing assembly according to claim 1, wherein the static gas bearing acts as a radial bearing for the rotatable element.

8. The bearing assembly according to claim 1, further comprising one or more second gas bearings acting as axial bearings for the rotatable element,
    wherein the one or more second gas bearings are enclosed by the sealed housing.

9. The bearing assembly according to claim 1, wherein the static gas bearing is a spherical gas bearing.

10. The bearing assembly according to claim 1, wherein the ultrasonic vibration pump is a first ultrasonic vibration pump, the bearing assembly further comprising at least one second ultrasonic vibration pump that is coupled to the static gas bearing,
    wherein the at least one second ultrasonic vibration pump is enclosed by the sealed housing and provides redundancy to the first ultrasonic vibration pump.

11. The bearing assembly according to claim 10, further comprising at least one third ultrasonic vibration pump that is coupled to the static gas bearing,
    wherein the at least one third ultrasonic vibration pump is enclosed by the sealed housing and coupled in series with the first ultrasonic vibration pump.

12. The bearing assembly according to claim 1, wherein a gas pressure in the sealed housing is in the range from 10 kPA to 80 kPA.

13. The bearing assembly according to claim 1,
    wherein the sealed housing is a flexible casing; and/or
    wherein the sealed housing comprises a sealed joint.

14. The bearing assembly according to claim 1, wherein the rotatable element is one of:
    a reaction wheel for a spacecraft;
    a control moment gyroscope for a spacecraft; or
    a reaction sphere for a spacecraft.

15. The bearing assembly according to claim 1, wherein the ultrasonic vibration pump is a first ultrasonic vibration pump, the bearing assembly further comprising another ultrasonic vibration pump that is enclosed by the sealed housing and coupled to the static gas bearing in series with the first ultrasonic vibration pump.

16. A reaction wheel assembly for a spacecraft, the reaction wheel assembly comprising:
    a reaction wheel; and
    the bearing assembly according to claim 1, for stabilizing rotation of the reaction wheel.

* * * * *